United States Patent
Nicholson et al.

(10) Patent No.: US 9,106,717 B2
(45) Date of Patent: Aug. 11, 2015

(54) SPEAKING PARTICIPANT IDENTIFICATION

(71) Applicant: LENOVO (Singapore) PTE, LTD., New Tech Park (SG)

(72) Inventors: John Weldon Nicholson, Cary, NC (US); Mark Charles Davis, Durham, NC (US); Elif Karakaya, Raleigh, NC (US); Scott Edwards Kelso, Cary, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 98 days.

(21) Appl. No.: 13/944,721

(22) Filed: Jul. 17, 2013

(65) Prior Publication Data

US 2015/0023221 A1    Jan. 22, 2015

(51) Int. Cl.
*H04L 29/06* (2006.01)

(52) U.S. Cl.
CPC .................................... *H04L 65/403* (2013.01)

(58) Field of Classification Search
CPC .................................................. H04L 65/403
USPC ............ 348/14.01, 14.08; 370/260, 389, 392; 379/67.1, 202.01; 704/275; 709/204; 715/753

See application file for complete search history.

(56) References Cited

U.S. PATENT DOCUMENTS

| | | | |
|---|---|---|---|
| 6,788,766 B2 * | 9/2004 | Logan ........................... | 379/67.1 |
| 6,947,417 B2 * | 9/2005 | Laursen et al. ............... | 370/389 |
| 7,185,055 B2 * | 2/2007 | Matsumoto et al. .......... | 709/204 |
| 7,664,056 B2 * | 2/2010 | Dye et al. ...................... | 370/260 |
| 7,808,521 B2 * | 10/2010 | Lengeling et al. ......... | 348/14.08 |
| 7,843,486 B1 * | 11/2010 | Blair et al. ................. | 348/14.01 |
| 8,117,550 B1 * | 2/2012 | Izdepski et al. ............... | 715/753 |
| 8,436,888 B1 * | 5/2013 | Baldino et al. ............. | 348/14.08 |
| 8,781,841 B1 * | 7/2014 | Wang ............................. | 704/275 |
| 2005/0259658 A1 * | 11/2005 | Logan et al. ................. | 370/392 |
| 2007/0263823 A1 * | 11/2007 | Jalava et al. ............. | 379/202.01 |
| 2012/0262537 A1 * | 10/2012 | Baker et al. ............... | 348/14.08 |
| 2015/0023221 A1 * | 1/2015 | Nicholson et al. ............ | 370/260 |

* cited by examiner

*Primary Examiner* — Gerald Gauthier
(74) *Attorney, Agent, or Firm* — Kunzler Law Group (57) ABSTRACT

For speaking participant identification, a communication module simulates a virtual communication channel for each participant in a media conference. An identification module identifies a speaking participant. The communication module further communicates audio input over the virtual communication channel for the speaking participant.

20 Claims, 8 Drawing Sheets

SPEAKING PARTICIPANT IDENTIFICATION

BACKGROUND

1. Field

The subject matter disclosed herein relates to participant identification and more particularly relates to speaking participant identification.

2. Description of the Related Art

During a media conference, such as a teleconference or a video conference, it can be difficult to determine who is speaking. However, the identity of the speaker is important to effective communication.

BRIEF SUMMARY

An apparatus for speaking participant identification is disclosed. The apparatus includes a memory storing machine readable code executable by a processor. The machine readable code includes a communication module and an identification module. The communication module simulates a virtual communication channel for each participant in a media conference. The identification module identifies a speaking participant. The communication module further communicates audio input over the virtual communication channel for the speaking participant. A method and computer program product also performs the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wire-line, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of figures may refer to elements described in previous figures, like numbers referring to like elements.

Figure 1:
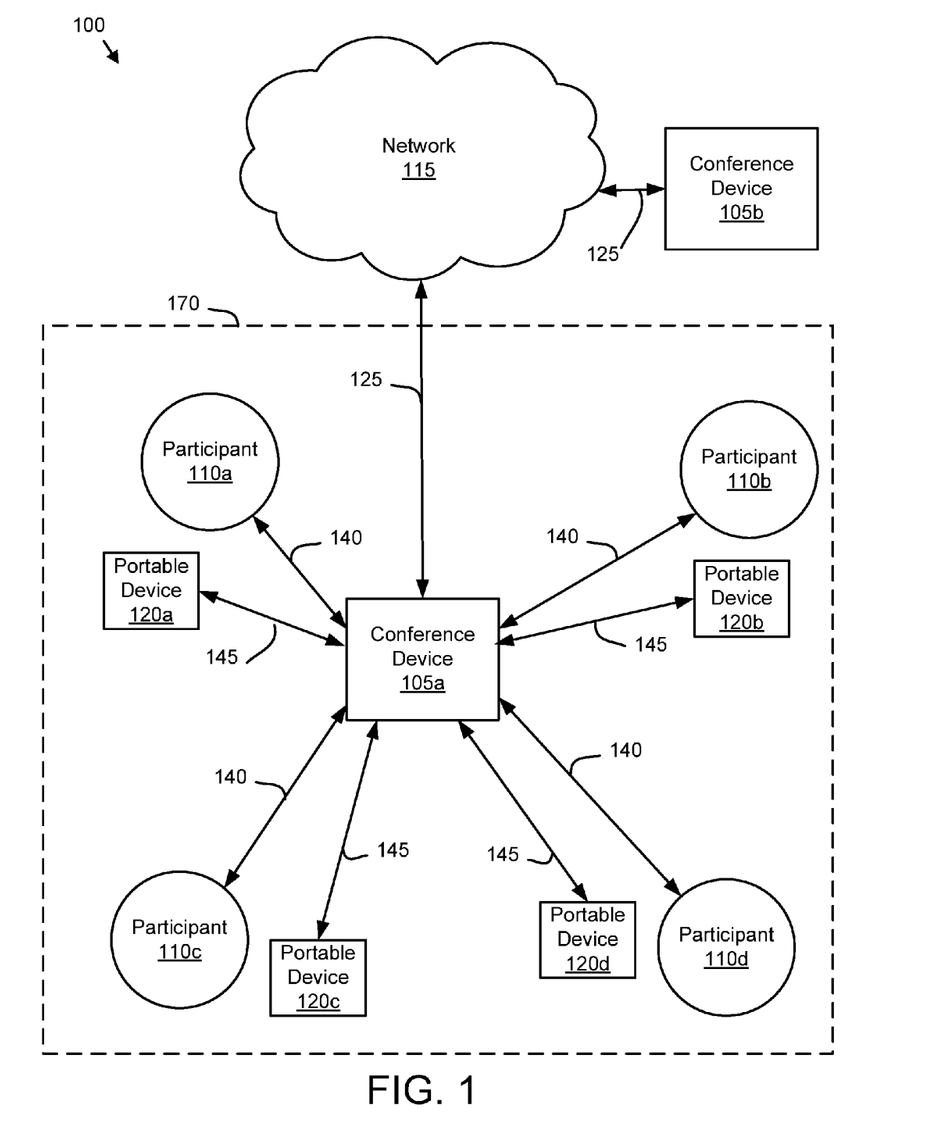
FIG. 1 is a schematic block diagram illustrating one embodiment of a media conference.

FIG. 1 is a schematic block diagram illustrating one embodiment of a media conference 100. The media conference 100 may be an audio conference. Alternatively, the media conference may be a videoconference. The media conference 100 includes one or more conference devices 105.

Each conference device 105 may include one or more microphones and one or more speakers. In addition, the conference device 105 may include one or more video displays and one or more video cameras. Alternatively, a conference device 105 may also be a telephone.

The conference device 105 communicates with a network 115 over communication channel 125. The network 115 may be the Internet, a local area network, a wide-area network, a private branch exchange (PBX) network, a commercial telephone network, a mobile telephone network, a wireless network, and combinations thereof. The communication channel 125 is compatible with the network 115. For example, the network 115 may include an Ethernet local area network and the Internet. The communications channel 125 may communicate data packets encoding the audio and/or video of the media conference 100 over the network 115.

For example, participants 110 in the media conference 100 at a first location 170 may communicate audio input 140 to a first conference device 105a. The audio input 140 may be digitized and communicated over the communication channel 125 is a plurality of packets.

In one embodiment, participants 110 may also employ portable devices 120 during the media conference 100. The portable devices 120 may communicate 145 with the first conference device 105a using an audible signal, a Wi-Fi signal, a Bluetooth signal, a multiple-input multiple-output signal (MIMO), an ultrasonic signal, and the like.

Figure 2:
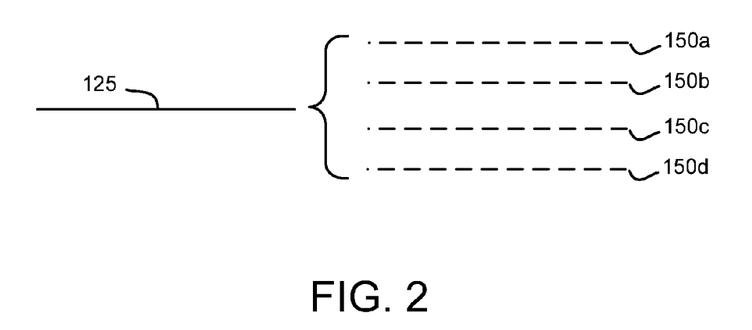
FIG. 2 is a schematic block diagram illustrating one embodiment of a communication channel.

Because the audio input 140 of each participant 110 goes through the first conference device 105a, in the past, there was no way of determining and/or indicating at other conference devices 105b which of the participants 110 was speaking. The embodiments described herein identify the speaking participant 110 of the media conference 100 by communicating the audio input 140 over a separate virtual communication channel for the speaking participant as will be described hereafter FIG. 2 is a schematic block diagram illustrating one embodiment of the communication channel 125 of FIG. 1. In the depicted embodiment, the communication channel 125 includes one or more virtual communication channels 150. In one embodiment, each virtual communication channel 150 has a unique Internet Protocol (IP) address. In addition, each virtual communication channel 150 may be a Voice over Internet Protocol (VoIP) communication channel.

Packets encoding the audio input 140 of the speaking participant 110 and traveling over the communication channel 125 may include the IP address of a specified virtual communication channel 150 for the speaking participant as an origination address. Thus when the encoded audio input 140 is received at other conference devices 105b, the identity of the speaking participant can be determined as originating from the virtual communication channel 150 of the speaking participant, allowing the speaking participant to be identified.

Figure 3:
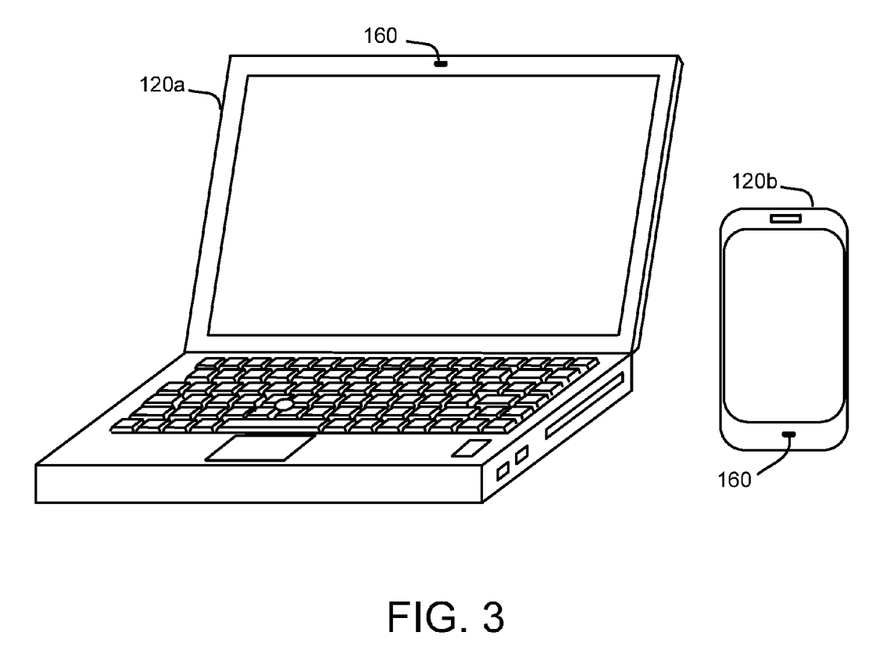
FIG. 3 is a drawing illustrating one embodiment of portable devices.

FIG. 3 is a drawing illustrating one embodiment of portable devices 120. The portable devices 120 are depicted as a laptop computer 120a and a mobile telephone 120b. Alternatively, the portable devices 120 may be tablet computers, eyeglass computers, wearable computers, and the like.

Each portable device 120 may include a microphone 160. In one embodiment, the microphones 160 are directional microphones. In addition, each portable device 120 may include one or more antennas for communicating wirelessly with the other portable devices 120 and the conference device 105.

Figure 4:
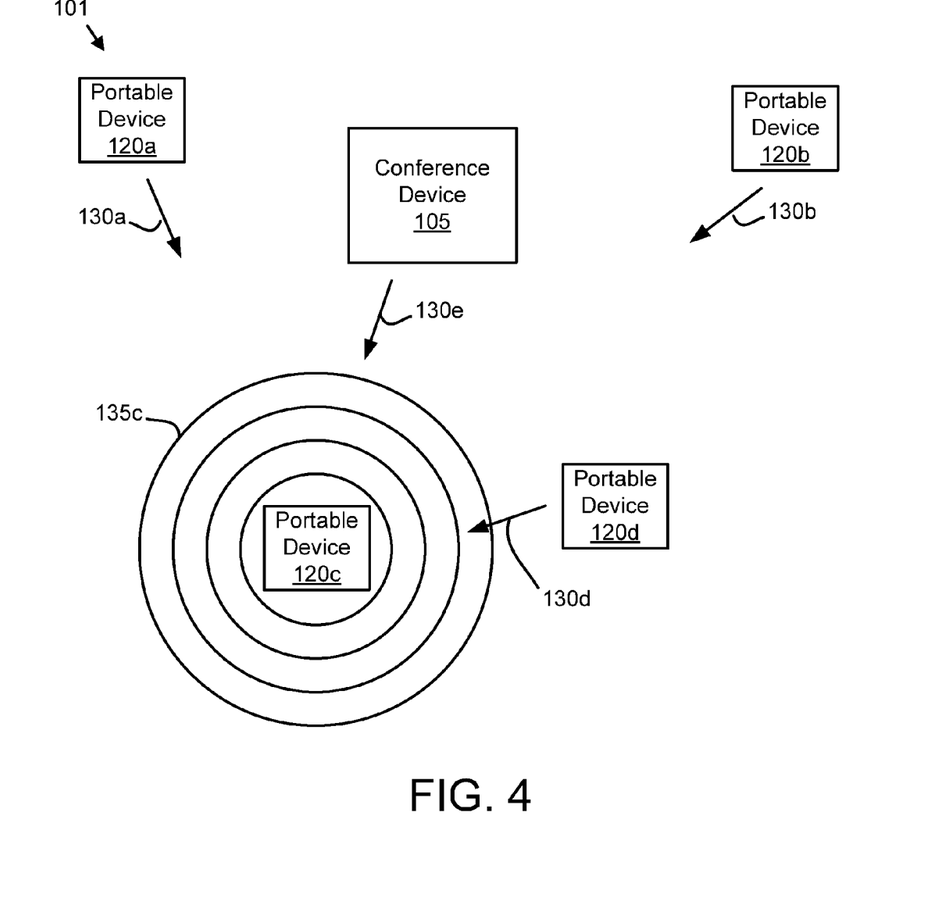
FIG. 4 is a schematic block diagram illustrating one embodiment of determining a position of a portable device.

FIG. 4 is a schematic block diagram illustrating one embodiment of determining a position of a portable device 120. A portable device 120 such as the third portable device 120c may emit an identity signal 135c. In one embodiment, the conference device 105 directs the third portable device 120c to emit the identity signal 135c. The identity signal 135c may be selected from the group consisting of an ultrasonic signal, a Wi-Fi signal, a Bluetooth signal, and an audible signal. For example, the identity signal 135c may be a 22 kilohertz (kHz) tone. The conference device 105 and each of the other portable devices 120 may also admit the identity signal 135.

In one embodiment, the identity signal 135c includes an encoded portable device identifier. The portable device identifier is selected from the group consisting of an Internet Protocol (IP) address, a Media Access Control (MAC) address, and a portable device name. For example, if the name of the third portable device 120c is "Sam's tablet," the identity signal 135c may encode the portable device identifier "Sam's tablet."

Other portable devices 120 and/or the conference device 105 may determine directions 130 to the third portable device 120c from the identity signal 135c. The directions 130 may be triangulated to calculate the position of the third portable device 120c. The calculation of the position of the other portable devices 120 and/or the conference device 105 may be performed in the same manner. In one embodiment, the position of the portable devices 120 may be calculated relative to the conference device 105.

In an alternate embodiment, the other portable devices 120 and/or the conference device 105 may determine a signal delay from the third portable device 120c. The signal delays at all the portable devices 120 and the conference device 105 may be compared to calculate the position of the third portable device 120c. Similarly, signal delays from the identity signal 135 admitted from the other portable devices 120 and/or the conference device 105 may be used to calculate the positions of each of the portable devices 120 and/or the conference device 105.

Figure 5:
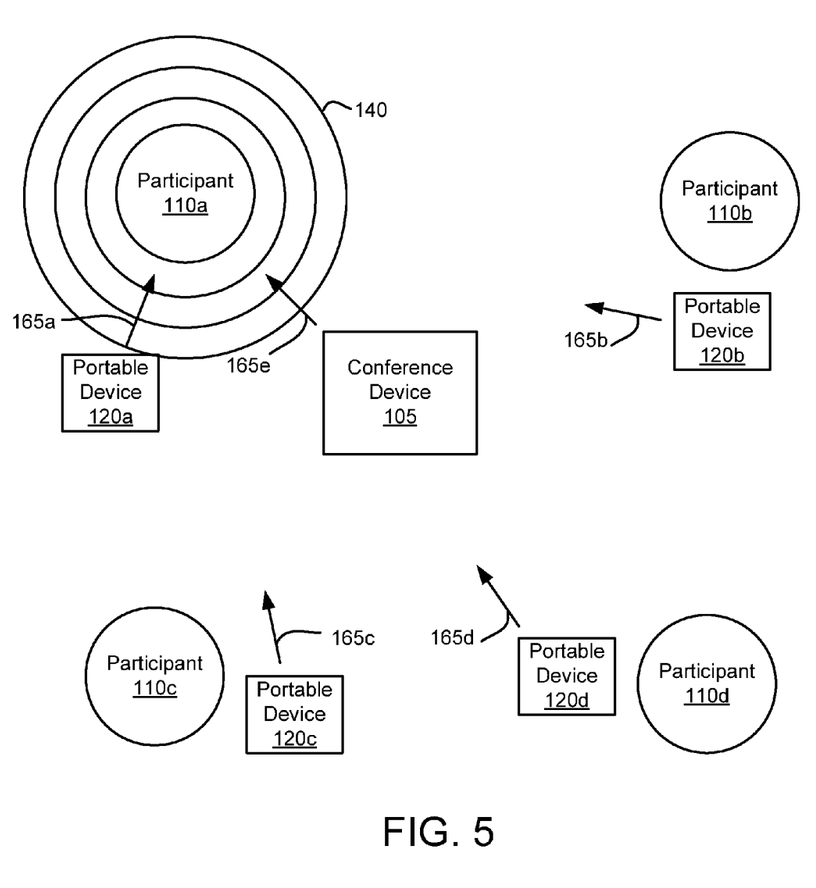
FIG. 5 is a schematic block diagram illustrating one embodiment of determining a position of a speaking participant.

FIG. 5 is a schematic block diagram illustrating one embodiment of determining a position and identity of a speaking participant 110. A speaking participant 110 such as the first participant 110a speaks, producing an audio input 140 that is received by the conference device 105. The position and/or the identity of the speaking participant 110 may be determined from the audio input 140.

In one embodiment, each portable device 120 records the start time that the audio input 140 is received. The start time may be recorded when an amplitude of the audio input 140 exceeds a start threshold. In one embodiment, the portable device 120 that records the earliest start time is determined to be the portable device 120 of the speaking participant 110. In the depicted example, if the first portable device 120a records the earliest start time, then the first portable device 120a is determined to be the portable device 120 of the speaking participant, the first participant 110a.

Each portable device 120 and/or the conference device 105 may determine a direction 165 to the speaking participant 110. In one embodiment, the portable devices 120 and the conference device 105 employee directional microphones 160 to determine the direction 165 to the speaking participant 110. The directions 165 may be triangulated to calculate the position of the speaking participant 110.

During an initialization period, each participant 110 may be prompted in turn to speak and the position of the speaking participant 110 identified. Subsequently, the identity of the speaking participant 110 is determined to be the participant 110 with an initially determined position closest to the position of the speaking participant 110. In the depicted example, the speaking participant 110 is determined to be the first participant 110a as the position of the speaking participant 110 is closest to the initially determined position of the first participant 110a.

In one embodiment, a video camera of the conference device 105 detects the speaking participant 110. For example, the video camera may detect mouth movements of the speaking participant 110. The video camera may further determine the direction 165 to the speaking participant 110.

Figure 6:
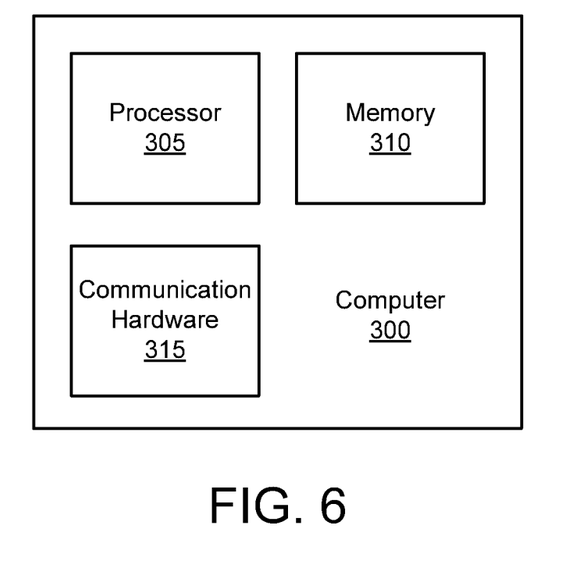
FIG. 6 is a schematic block diagram illustrating one embodiment of a computer.

FIG. 6 is a schematic block diagram illustrating one embodiment of a computer 300. The computer may be embodied in the conference device 105. Alternatively, the computer may be embodied in one or more of the portable devices 120. The computer includes a processor 305, memory 310, and communication hardware 315.

Figure 7:
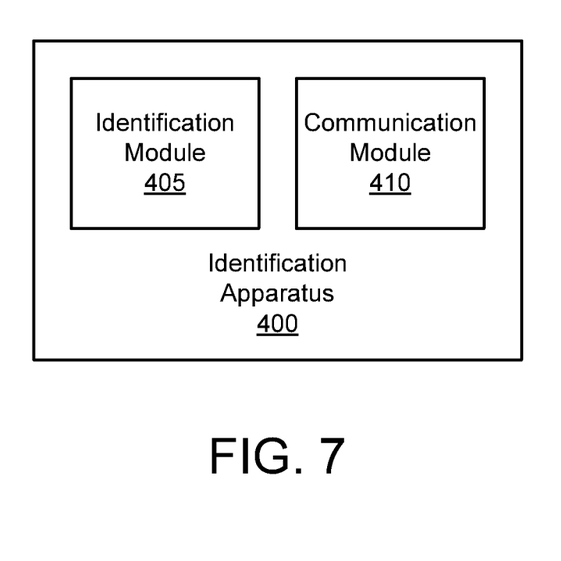
FIG. 7 is a schematic block diagram illustrating one embodiment of an identification apparatus.

The memory 310 may be a semiconductor storage device, a hard disk drive, an optical storage device, a micromechanical storage device, or combinations thereof. The memory 310 may store machine readable code. The processor 305 executes the machine readable code to perform functions. The communication hardware 315 may communicate with other devices FIG. 7 is a schematic block diagram illustrating one embodiment of an identification apparatus 400. The apparatus 400 may be embodied in the computer 300 of FIG. 6. In one embodiment, the apparatus 400 is embodied in the conference device 105. The apparatus 400 includes an identification module 405 and a communication module 410. The identification module 405 and the communication module 410 may be embodied in the memory 310 storing the machine readable code. The processor 305 may execute the machine readable code to perform the functions of the identification module 405 and the communication module 410.

The communication module 410 may simulate a virtual communication channel 150 for each participant 110 in the media conference 100. The identification module 405 may identify the speaking participant 110. The communication module may communicate audio input 140 of the media conference 100 over the virtual communication channel 150 for the speaking participant 110. Details of the functions of the identification module 405 and the communication module 410 will be described hereafter.

Figure 8:
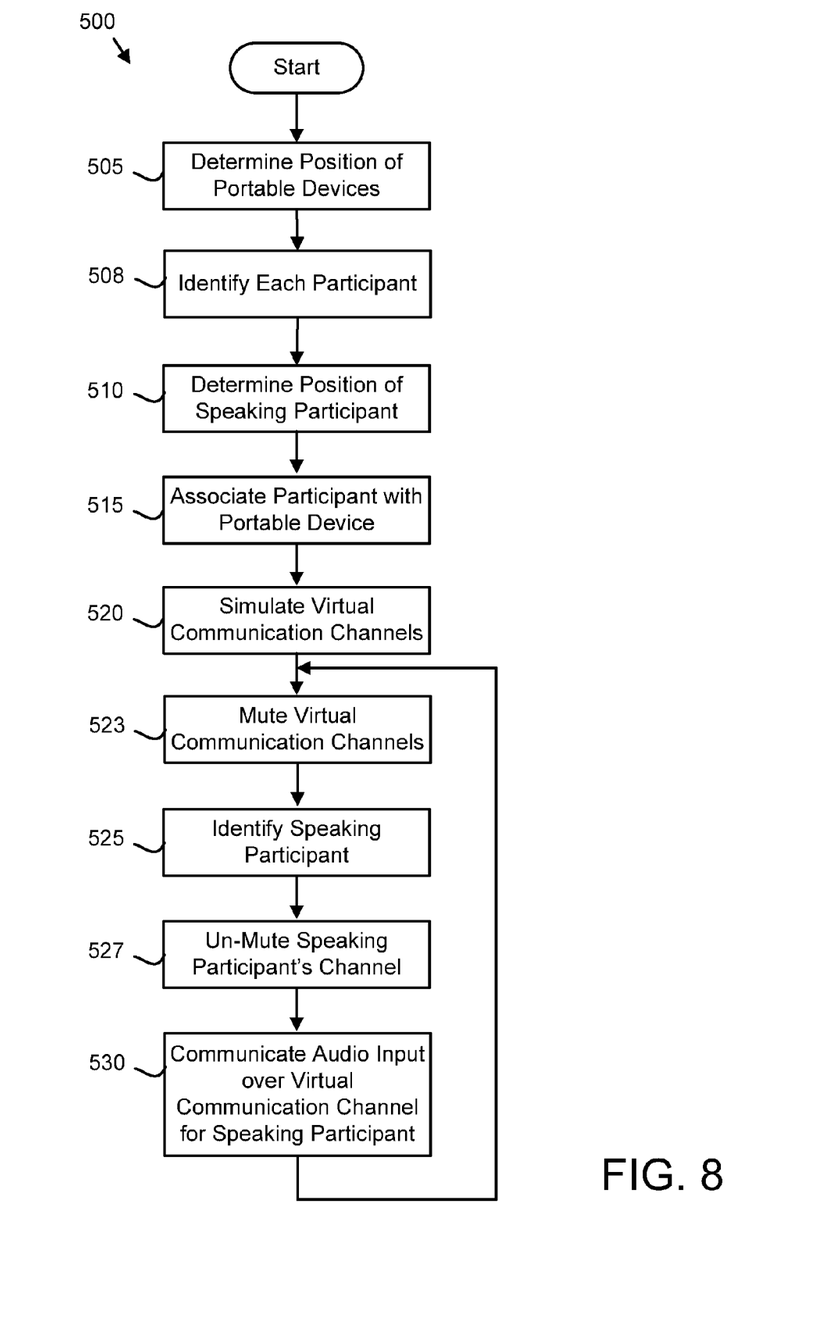
FIG. 8 is a schematic flow chart diagram illustrating one embodiment of a speaking participant identification method.

FIG. 8 is a schematic flow chart diagram illustrating one embodiment of a speaking participant identification method 500. The method 500 may perform the functions of the media conference 100 and the apparatus 400. The functions of the method 500 may be performed by the processor 305. Alternatively, the functions of the method 500 may be performed by a computer readable storage medium such as the memory 310 storing machine readable code executable by the processor 305.

The method 500 starts, and in one embodiment the identification module 405 determines 505 a position of at least one portable device 120. The identification module 405 may determine 505 the position of the at least one portable device 120 as described in FIG. 4. In one embodiment, the identification module 405 determines 505 the position of the at least one portable device 120 using the device position determination method 501 as will be described hereafter in FIG. 9.

Figure 10:
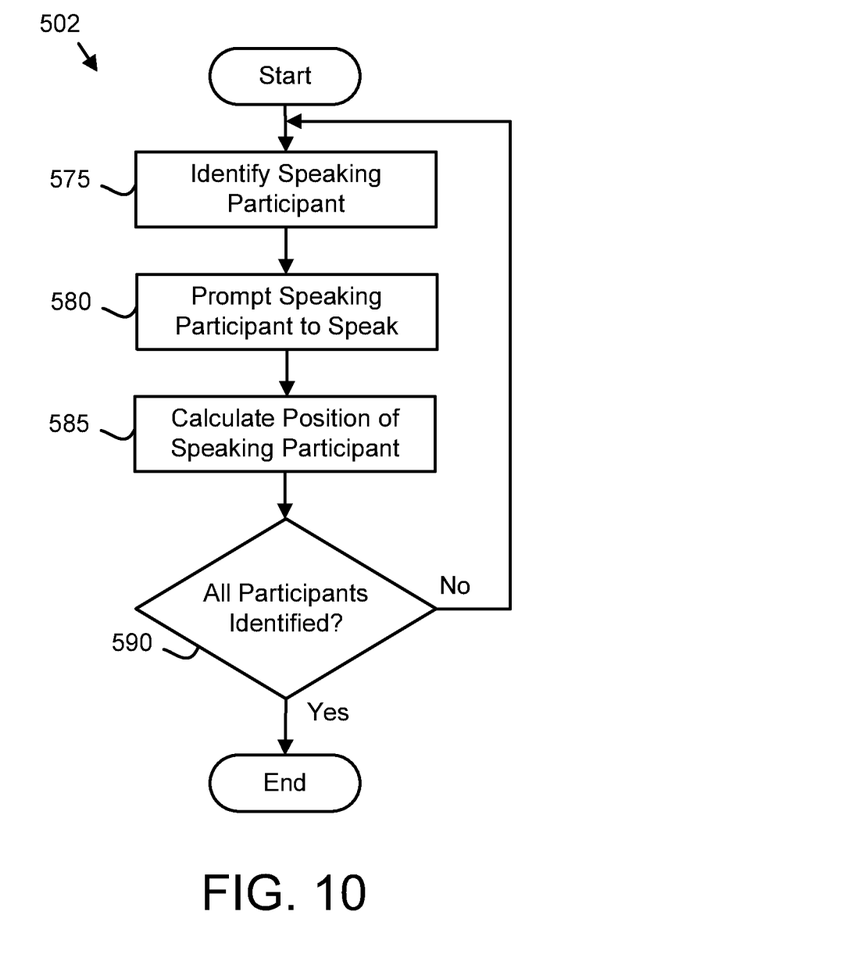
FIG. 10 is a schematic flow chart diagram illustrating one embodiment of a participant identification method.

The identification module 405 further determines 510 the position of the speaking participant 110. Each participant 110 may be prompted to speak in turn so that the positions of all participants 110 may be determined 510. The identification module 405 may determine 510 the position of the speaking participant 110 as described in FIG. 5. In one embodiment, the position of the speaking participant 110 is determined 510 using the participant identification method 502 of FIG. 10 is will be described hereafter.

In one embodiment, the identification module 405 identifies 508 each participant 110. The identification module 405 may identify the participants 110 from the portable devices 120. For example, identification module 405 may query each portable device 120 for the name of the participant 110 associated with the portable device 120. The identification module 405 may construct a list of the participants 110 from the names of the participants 110 provided by the portable devices 120.

The identification module 405 may associate 515 the speaking participant 110 with a first portable device 120a. In one embodiment, the identification module 405 associates 515 each participant 110 with a portable device 120. For example, the identification module 405 may associate 515 each participant 110 with a portable device 120 when the participant is the speaking participant 110.

The communication module 410 may simulate 520 the virtual communication channels 150 for each participant 110. In one embodiment, the communication module 410 simulates 520 virtual communication channels 150 for each of the participants 110 on the list of participants 110.

In one embodiment, the communication module 410 may mute 523 all of the virtual communication channels 150. The virtual communication channels 150 may be muted 523 by not transmitting packets associated with the virtual communication channels 150.

The identification module 405 identifies 525 the speaking participant 110. In one embodiment, the identification module 405 identifies 525 the speaking participant 110 by detecting the audio input 140 from the speaking participant 110 at one or more of the portable devices 120 and the conference device 105. The identification module 405 may further receive the direction 165 of the audio input 140 from the one or more of the portable devices 120 and the conference device 105.

In one embodiment, the identification module 405 calculates an area of intersection for the directions 165 of the audio input 140 from the speaking participant 110. The area of intersection may be the area containing each intersection of one or more directions 165. The identification module 405 may further determine the participant 110 with a position that is closest to the area of intersection. The identification module 405 may identify 525 the speaking participant 110 as the participant 110 with the position closest to the area of intersection.

In one embodiment, the one or more of the portable devices 120 and the conference device 105 records the start time for the audio input 140. The identification module 105 may determine which of the portable devices 120 and/or conference device 105 recorded the earliest start time. In one embodiment, the identification module 405 identifies 525 the speaking participant 110 as the participant 110 associated with the portable device 120 with the earliest recorded start time. In an alternative embodiment, the identification module 405 may identify 525 the speaking participant 110 as the participant 110 with the position closest to the position of the portable device 120 and/or conference device 105 that records the earliest start time.

In a certain embodiment, the identification module 405 identifies 525 the speaking participant 110 from a frequency of the audio input 140. For example, the identification module 405 may determine a representative speaking frequency for each participant 110. The identification module 405 may identify the speaking participant 110 as the participant 110 with a representative speaking frequency closest to the frequency of the audio input 140.

In one embodiment, the identification module 405 identifies the speaking participant 110 from a set of participants 110 that are associated with at least one portable device 120. For example, the identification module 405 may identify the speaking participant 110 from the list of participants 110.

The communication module 410 may un-mute 527 the virtual communication channel 150 for the speaking participant 110. The virtual communication channel 150 for the speaking participant 110 may be un-muted by allow transmission of the digitized audio input 140 with packets bearing an origination address for the virtual communication channel 150 of the speaking participant 110.

The communication module 410 may further communicate 530 the audio input 140 over the virtual communication channel 150 for the speaking participant 110. In one embodiment, the communication module 410 digitizes the audio input 140. In addition, the communication module 410 may transmit packets containing the digitized audio input 140 over the communication channel 125, with the packets bearing the origination address for the virtual communication channel 150 of the speaking participant 110.

In one embodiment, the communication module 410 communicates 530 the name of the speaking participant 110 along with the digitized audio input 140 over the virtual communication channel 150 for the speaking participant 110.

In one embodiment, the communication module 410 continues to communicate 530 the audio input 140 over the virtual communication channel 150 until the audio input 140 from the speaking participant 110 ceases. When the audio input 140 from the speaking participant 110 ceases, the communication module 410 may loop to mute 523 all the virtual communication channels 150.

Figure 9:
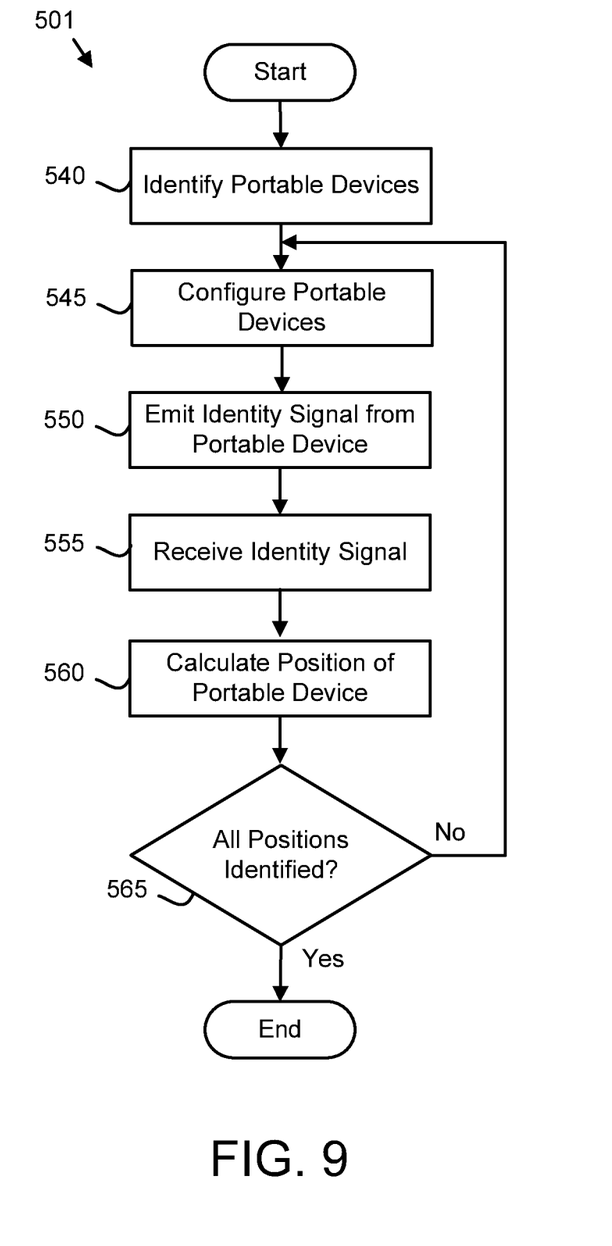
FIG. 9 is a schematic flow chart diagram illustrating one embodiment of a device position determination method.

FIG. 9 is a schematic flow chart diagram illustrating one embodiment of a device position determination method 501. In one embodiment, the method 501 performs the functions of the "determine position of portable devices" step 505 of the method 500 of FIG. 8. The method 501 may perform the functions of the media conference 100 and the apparatus 400. The functions of the method 501 may be performed by the processor 305. Alternatively, the functions of the method 501 may be performed by a computer readable storage medium such as the memory 310 storing machine readable code executable by the processor 305.

The method 501 may be employed to initialize the media conference 100. The method 501 starts, and in one embodiment, the identification module 405 identifies 540 the portable devices 120 in the media conference 100. In one embodiment, the identification module 405 detects and queries the portable devices 120. Alternatively, the identification module 405 may audibly request each participant 110 to connect a portable device 120 to the conference device 105. For example, the identification module 405 may request the participants 110 to connect their portable devices 120 to the conference device 105 through a Bluetooth connection. Alternatively, the participants 110 may identify portable devices 120 by activating an application on each portable device 120. The application may identify the portable device 120 to the identification module 405. In addition, the application may transmit other information including the direction 165 of the speaking participant 110.

In one embodiment, the identification module 405 configures 545 the portable devices 120. The identification module 405 may configure 545 the portable devices 120 to communicate the direction 165 of the audio input 140 to the identification module 405. In addition, the portable devices 120 may be configured to record and communicate the start time of each audio input 140.

In one embodiment, the identification module 405 configures the portable devices 120 to emit the identity signal 135. In addition the portable devices 120 may be configured 545 to receive the identity signal 135 and to communicate information related to the identity signal 135 including the start time when identity signal 135 is received, a direction 130 of the identity signal 135, the encoded portable device identifier, and the like to the identification module 405.

The identification module 405 may direct the first portable device 120*a* to emit 550 the identity signal 135. In one embodiment, the identification module 405 transmits a command to the first portable device 120*a* specifying how to emit 550 the identity signal 135.

The identification module 405 may further receive 555 the identity signal 135 from one or more of another portable device 120 and the conference device 105. In one embodiment, the identity signal 135 includes a start time of the identity signal 135 and the direction 130 of the identity signal 135.

In one embodiment, the identification module 405 calculates 560 the position of the first portable device 120*a*. The identification module 405 may calculate the area of intersection for each of the directions 130, wherein all intersections for the directions 130 are within the area of intersection. The identification module 105 may further calculate a center of the area of intersection for the directions 130. In one embodiment, the calculation module 405 calculates 560 the position of the first portable device 120*a* as the area of intersection for the directions 130. Alternatively, the position of the first portable device 120*a* may be the center of the area of intersection for the directions 130.

In one embodiment, the identification module 405 calculates 560 the position of the first portable device 120*a* from the start times of a plurality of identity signals 135. A distance between one or more of the portable devices 120 and the conference device 105 may be determined from the difference between a transmission time and the start times for the identity signals 135. The transmission time may be the time when the identity signal 135 is emitted 550. The identification module 405 may further assign an initial estimated position to each of the portable devices 120 and the conference device 105, and then iteratively modify the estimated positions until the distances between the one or more portable devices 120 and the conference device 105 calculated from the transmission time and the start times are equivalent to the distance is calculated between the estimated positions. The estimated positions that satisfy the distances between the one or more portable devices 120 and the conference device 105 calculated from the transmission time in the start times are the positions for the portable devices 120.

The identification module 405 may further determine 565 if all positions for all portable devices 120 are identified. If all positions are not identified, the identification module 405 may loop to configure 545 an additional portable device 120. If all positions are identified, the method 501 ends.

FIG. 10 is a schematic flow chart diagram illustrating one embodiment of a participant identification method 502. In one embodiment, the method 502 performs the "determine position of speaking participant" step 510 of the method 500 of FIG. 8. The method 502 may perform the functions of the media conference 100 and the apparatus 400. The functions of the method 502 may be performed by the processor 305. Alternatively, the functions of the method 502 may be performed by a computer readable storage medium such as the memory 310 storing machine readable code executable by the processor 305.

The method 502 may be employed to initialize the media conference 100. The method 502 starts, and in one embodiment, the identification module 405 identifies 575 the speaking participant 110. In one embodiment, the identification module 405 identifies 575 the speaking participant 110 from the list of participants 110. Each participant 110 may be selected in turn as the speaking participant 110.

In one embodiment, the identification module 405 prompts 580 the speaking participant 110 to speak. In one embodiment, the conference device 105 audibly prompts the speaking participant 110 to speak. For example, the conference device 105 may state the name of the speaking participant 110 and request the speaking participant 110 speak until the speaking participant 110 hears an audible tone. Alternatively, the conference device 105 may send a message to the portable device 120 of the speaking participant 110 requesting the speaking participant 110 speak. The conference device 105 may further send a second message instructing the speaking participant 110 to stop talking when sufficient information to calculate the position of the speaking participant 110 has been received.

The identification module 405 may further calculate 585 the position of the speaking participant 110. In one embodiment, the identification module 405 calculates 585 the position as described in FIG. 5.

The identification module 405 may further determine 590 if all participants 110 are identified. If all participants 110 are not identified, the identification module 405 loops to identify 575 a next speaking participant 110. If all participants are identified, the method 502 ends.

Media conferences are an increasingly important part of business, government, education, and science. Media conferences have grown in popularity because excellent audio systems make it possible to hear all participants 110. However, one cannot always determine which participant 110 is speaking. This is particularly true when there is no video available in the media conference 100 and when a participant 110 is not familiar with all of the other participants 110.

By identifying the speaking participant 110 and communicating the audio input 140 for the media conference 100 over the virtual communication channel 150 for the speaking participant 110, the embodiments allow other conference devices 105b to provide the identity of the speaking participant 110. In addition, many existing conference devices 105 are capable of providing the identity of the speaking participant 110 without modification as these existing conference devices 105 identify the speaking participant 110 from the communication channel 125 that provides the digitized audio input 140. Because the virtual communication channel 150 for the speaking participant 110 is indistinguishable from other communication channels 125 to the downstream conference device 105b, the downstream conference device 105b may recognize the speaking participant 110.

By enabling the identification of the speaking participant 110, the effectiveness of the media conference 100 is enhanced. As a result, participants 110 communicate more easily and efficiently.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory storing machine readable code executable by the processor, the machine readable code comprising:
a communication module simulating a virtual communication channel for each participant in a media conference;
an identification module identifying a speaking participant by determining a position of at least one portable device, determining a position of the speaking participant, and identifying the speaking participant from the at least one portable device; and
the communication module communicating audio input over the virtual communication channel for the speaking participant.

2. The apparatus of claim 1, the identification module further:
associating the speaking participant with a first portable device.

3. The apparatus of claim 2, the identification module further:
receiving an identity signal from the at least one portable device with one or more of another portable device and a conference device; and
calculating the position of the at least one portable device from at least two directions of the identity signal.

4. The apparatus of claim 2, wherein the identification module determines the position of the speaking participant by:
identifying the speaking participant;
prompting the speaking participant to speak; and
calculating the position of the speaking participant from directions of the speaking participant's speech at the at least one portable device.

5. A method comprising:
simulating, by use of a processor, a virtual communication channel for each participant in a media conference;
identifying a speaking participant by determining a position of at least one portable device, determining a position of the speaking participant, and identifying the speaking participant from the at least one portable device; and
communicating audio input over the virtual communication channel for the speaking participant.

6. The method of claim 5, further comprising
associating the speaking participant with a first portable device.

7. The method of claim 6, wherein the position of the at least one portable device is determined by:
receiving an identity signal from the at least one portable device with one or more of another portable device and a conference device; and
calculating the position of the at least one portable device from at least two directions of the identity signal.

8. The method of claim 7, wherein the identity signal is selected from the group consisting of an ultrasonic signal, a Wi-Fi signal, a Bluetooth signal, a multiple-input multiple-output signal (MIMO), and an audible signal.

9. The method of claim 8, wherein the identity signal comprises an encoded portable device identifier.

10. The method of claim 9, wherein the portable device identifier is selected from the group consisting of an Internet Protocol (IP) address, a Media Access Control (MAC) address, and a portable device name.

11. The method of claim 6, wherein determining the position of the speaking participant comprises:
identifying the speaking participant;
prompting the speaking participant to speak; and
calculating the position of the speaking participant from directions of the speaking participant's speech at the at least one portable device.

12. The method of claim 11, wherein the speaking participant is identified from the participants associated with the at least one portable device.

13. The method of claim 6, further comprising providing a speaking participant's name from the first portable device.

14. The method of claim 5, further comprising communicating an identity of the speaking participant.

15. The method of claim 5, further comprising muting all virtual communication channels and un-muting the virtual communication channel of the speaking participant.

16. The method of claim 5, wherein the virtual communication channel is a Voice over Internet Protocol (VoIP) channel.

17. A program product comprising a computer readable storage medium storing machine readable code executable by a processor to perform:
    simulating a virtual communication channel for each participant in a media conference;
    identifying a speaking participant determining a position of at least one portable device, determining a position of the speaking participant, and identifying the speaking participant from the at least one portable device; and
    communicating audio input over the virtual communication channel for the speaking participant.

18. The program product of claim 17, further comprising associating the speaking participant with a first portable device.

19. The program product of claim 18, wherein the position of the at least one portable device is determined by;
    receiving an identity signal from the at least one portable device with one or more of another portable device and a conference device; and
    calculating the position of the at least one portable device from at least two directions of the identity signal.

20. The program product of claim 18, wherein determining the position of the speaking participant comprises:
    identifying the speaking participant;
    prompting the speaking participant to speak; and
    calculating the position of the speaking participant from directions of the speaking participant's speech at the at least one portable device.

\* \* \* \* \*